United States Patent
Zhou et al.

(10) Patent No.: US 9,965,704 B2
(45) Date of Patent: May 8, 2018

(54) DISCOVERING VISUAL CONCEPTS FROM WEAKLY LABELED IMAGE COLLECTIONS

(71) Applicant: PayPal Inc., San Jose, CA (US)

(72) Inventors: Bolei Zhou, Cambridge, MA (US); Robinson Piramuthu, Oakland, CA (US); Vignesh Jagadeesh, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 0 days. days.

(21) Appl. No.: 14/929,044

(22) Filed: Oct. 30, 2015

(65) Prior Publication Data
US 2016/0125274 A1    May 5, 2016

Related U.S. Application Data

(60) Provisional application No. 62/073,330, filed on Oct. 31, 2014.

(51) Int. Cl.
| G06K 9/66 | (2006.01) |
| G06K 9/48 | (2006.01) |
| G06F 17/30 | (2006.01) |
| G06K 9/62 | (2006.01) |
| G06K 9/52 | (2006.01) |

(52) U.S. Cl.
CPC .......... G06K 9/66 (2013.01); G06F 17/30247 (2013.01); G06K 9/481 (2013.01); G06K 9/6223 (2013.01); G06K 9/6267 (2013.01)

(58) Field of Classification Search
CPC ........ G06K 9/66; G06K 9/6223; G06K 9/481; G06K 9/6267; G06F 17/30247
See application file for complete search history.

(56) References Cited

U.S. PATENT DOCUMENTS

| 8,315,465 B1 | 11/2012 | Baluja et al. |
| 8,429,168 B1 * | 4/2013 | Chechik ............ G06F 17/30247 707/741 |
| 8,909,563 B1 * | 12/2014 | Jing .................. G06K 9/00664 382/180 |
| 2003/0110147 A1 | 6/2003 | Li et al. |
| 2006/0251292 A1 | 11/2006 | Gokturk et al. |
| 2007/0086660 A1 | 4/2007 | Ai et al. |

(Continued)

FOREIGN PATENT DOCUMENTS

WO    WO-2016070098 A2    5/2016

OTHER PUBLICATIONS

"International Application Serial No. PCT/US2015/058407, International Search Report dated Jun. 30, 2016", 3 pgs.

(Continued)

*Primary Examiner* — Sean Conner
*Assistant Examiner* — Pinalben Patel
(74) *Attorney, Agent, or Firm* — Maschoff Brennan

(57) ABSTRACT

Images uploaded to photo sharing websites often include some tags or sentence descriptions. In an example embodiment, these tags or descriptions, which might be relevant to the image contents, become the weak labels of these images. The weak labels can be used to identify concepts for the images using an iterative hard instance learning algorithm to discover visual concepts from the label and visual feature representations in the weakly labeled images. The visual concept detectors can be directly applied to concept recognition and detection.

18 Claims, 14 Drawing Sheets

(56) References Cited

U.S. PATENT DOCUMENTS

| | | | |
|---|---|---|---|
| 2008/0310737 A1 | 12/2008 | Han et al. | |
| 2009/0125461 A1* | 5/2009 | Qi | G06N 99/005 |
| | | | 706/12 |
| 2009/0313294 A1* | 12/2009 | Mei | G06F 17/30265 |
| 2010/0040285 A1* | 2/2010 | Csurka | G06K 9/00624 |
| | | | 382/170 |
| 2012/0269436 A1* | 10/2012 | Mensink | G06K 9/00624 |
| | | | 382/180 |
| 2013/0315479 A1* | 11/2013 | Paris | G06K 9/6256 |
| | | | 382/159 |
| 2014/0085329 A1* | 3/2014 | Codella | G06F 17/30 |
| | | | 345/629 |
| 2014/0201126 A1* | 7/2014 | Zadeh | G06K 9/627 |
| | | | 706/52 |
| 2015/0063688 A1* | 3/2015 | Bhardwaj | G06K 9/18 |
| | | | 382/159 |
| 2015/0317389 A1* | 11/2015 | Hua | G06F 17/30705 |
| | | | 706/12 |
| 2016/0217349 A1* | 7/2016 | Hua | G06K 9/6218 |
| 2016/0232658 A1* | 8/2016 | Syeda-Mahmood | G06K 9/00751 |
| 2017/0330059 A1* | 11/2017 | Novotny | G06K 9/66 |

OTHER PUBLICATIONS

"International Application Serial No. PCT/US2015/058407, Written Opinion dated Jun. 30, 2016", 6 pgs.

* cited by examiner

| IMAGE | WEAK LABELS |
|---|---|
| 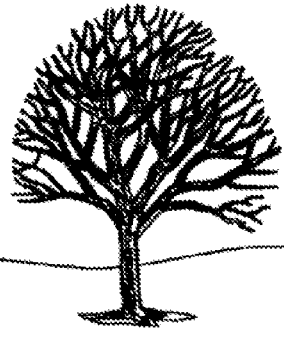 | LIGHT<br>TREE<br>SUN<br>ENGLAND<br>FIELD<br>FENCE |
| 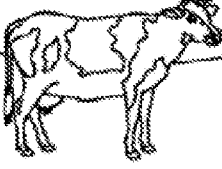 | IRELAND<br>COW |
| 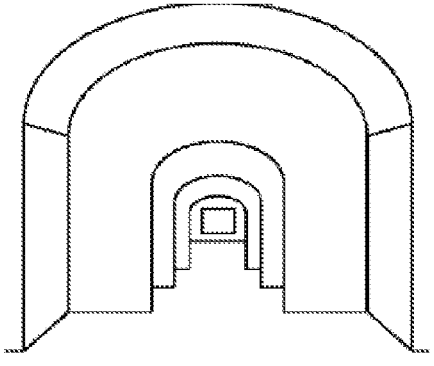 | WOW<br>JAPAN<br>TEMPLE |
*FIG. 3*

| IMAGE | WEAK LABELS | EXTRACTED PHRASES |
|---|---|---|
| 410 | THIS IS MY FRIEND TAKING A NAP IN MY SLEEPING BAG WITH OUR FRIEND'S DOG FOR COMPANY. | NSUBJ(FRIEND-4, THIS-1)<br>COP(FRIEND-4, IS-2)<br>POSS(FRIEND-4, MY-3)<br>ROOT(ROOT-0, FRIEND-4)<br>VMOD(FRIEND-4, TAKING-5)<br>DET(NAP-7, A-6)<br>DOBJ(TAKING-5, NAP-7)<br>AMOD(BAG-11, SLEEPING-10)<br>PREP_IN(TAKING-5, BAG-11)<br>PREP_FOR(DOG-16, COMPANY-18) |
| | A TROPICAL FOREST IN THE TRAIN STATION! HOW COOL IS THAT! | DET(FOREST-3, A-1)<br>AMOD(FOREST-3, TROPICAL-2)<br>NSUB(!-8, FOREST-3)<br>DET(STATION-7, THE-5)<br>NN(STATION-7, TRAIN-6)<br>PREP_IN(FOREST-3, STATION-7)<br>ADVMOD(THAT-12, HOW-9)<br>NSUB(THAT-12, COOL-10)<br>COP(THAT-12, IS-11)<br>CCOMP(!-8, THAT-12) |

*FIG. 4A*

| IMAGE | WEAK LABELS | EXTRACTED PHRASES |
|---|---|---|
|  | AFTER SANDBOARDING I NEEDED TO WASH OFF THE SAND IN THE INDIAN OCEAN WITH ITS BEAUTIFUL WHITE SANDY BEACH | ROOT(ROOT-0, AFTER-1) PCOMP(AFTER-1, SANDBOARDING-2) XSUBJ(WASH-6, I-3) AUX(WASH-6, TO-5) XCOMP(NEEDED-4, WASH-6) PREP_OF(WASH-6, SAND-9) PREP_IN(SAND-9, OCEAN-13) AMOD(BEACH-20, BEAUTIFUL-17) PREP_WITH(WASH-6, BEACH-20) |
|  | CERVICHE I ASSUME, A STREET SCENE IN MANTA TAKEN FROM THE BUS WINDOW | ROOT(ROOT-0, CERVICHE-1) CCOMP(CERVICHE-1, ASSUME-3) DET(SCENE-7, A-5) NN(SCENE-7, STREET-6) NSUBJ(TAKEN-10, SCENE-7) PREP_IN(SCENE-7, MANTA-9) DEP(ASSUME-3, TAKEN-10) DET(WINDOW-14, THE-12) NN(WINDOW-14, BUS-13) PREP_FROM(TAKEN-10, WINDOW-14) |

*FIG. 4B*

| IMAGE | STRONG LABELS |
|---|---|
| 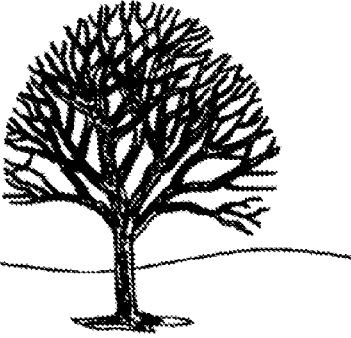 | LIGHT<br>TREE<br>FIELD<br>FENCE<br>TREES<br>GRASS<br>SKY |
|  | COW<br>CLOUD<br>SKY<br>YELLOW<br>GRASS<br>FIELD |
| 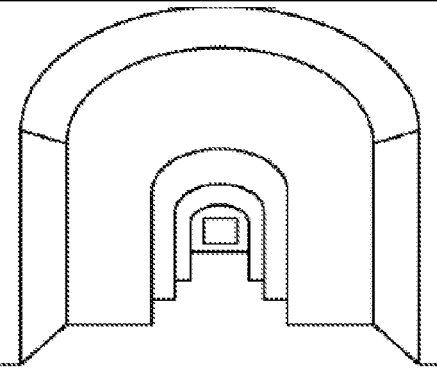 | TEMPLE<br>ARCH<br>WALL<br>STONES<br>ANCIENT |
*FIG. 6*

DISCOVERING VISUAL CONCEPTS FROM WEAKLY LABELED IMAGE COLLECTIONS

PRIORITY CLAIM

The application claims priority to U.S. Provisional Patent Application No. 62/073,330, filed Oct. 31, 2014, entitled "Discovering Visual Concepts from Weakly Labeled Image Collections," which is incorporated herein by reference in its entirety.

TECHNICAL FIELD

The subject matter disclosed herein generally relates to computer vision recognition systems. Specifically, the present disclosure addresses systems and methods related to the identification of concept categories for images that are weakly labeled.

BACKGROUND

Labeled datasets of images are used to train computer vision recognition systems to identify categories of future images. To build a large labeled dataset of images, crowd-sourcing may be used to combine the labeling efforts of many individuals. Since each image must be individually labeled, the cost of building a large labeled dataset is high.

An alternative way to build a large labeled dataset of images is to use an image search engine to search for images related to each desired label. However, the resulting image nets will contain outlier images and images related to different uses of a word. For example, a search for "apple" will return images of fruit and Apple™ products. Relative to manual labeling of images, the automation of the process lowers the cost but results in lower accuracy. Additionally, the image search engine itself must be trained before the process can begin.

BRIEF DESCRIPTION OF THE DRAWINGS

Some embodiments are illustrated, by way of example and not limitation, in the figures of the accompanying drawings.

FIG. 3 is a block diagram illustrating a schema for a weakly-labeled data table for use in a system for discovering visual concepts from weakly labeled image collections, according to particular disclosed embodiments.

FIGS. 4A-4B are block diagrams illustrating a schema for a weakly-labeled data table for use in a system for discovering visual concepts from weakly labeled image collections, according to particular disclosed embodiments.

FIG. 6 is a block diagram illustrating a schema for a strongly-labeled data table for use in a system for discovering visual concepts from weakly labeled image collections, according to particular disclosed embodiments.

DETAILED DESCRIPTION

Figure 1:
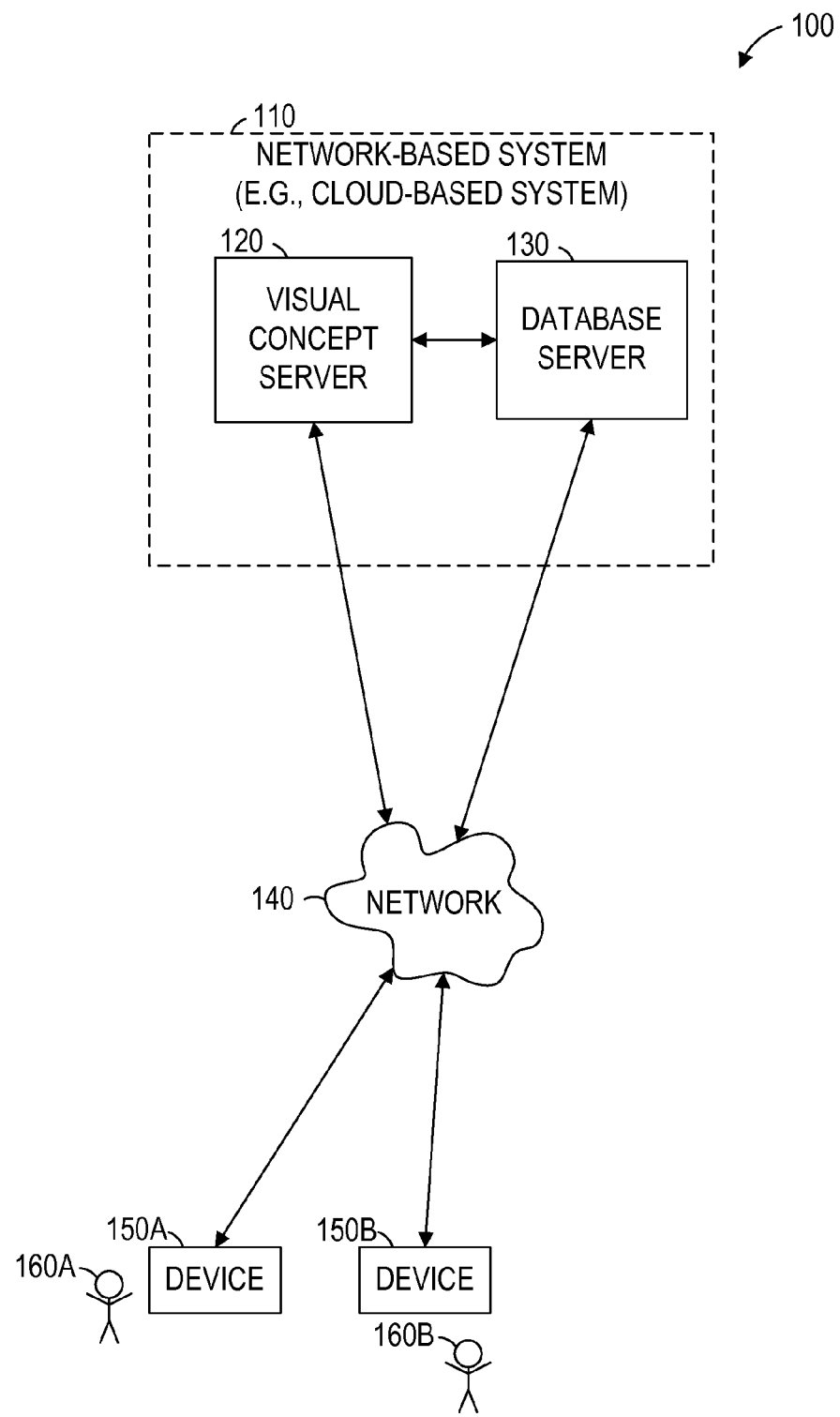
FIG. 1 is a network diagram illustrating a network environment suitable for discovering visual concepts from weakly labeled image collections, according to some example embodiments.

Example methods and systems are directed to discovering visual concepts from weakly labeled image collections. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

When people upload images to photo sharing websites like Flickr™ Instagram™, and Facebook™, usually they will include some tags or sentence descriptions. These tags or descriptions, which might be relevant to the image contents, can be treated as weak labels of these images. Despite the noise in these weak labels, the labels, in the aggregate, still contain useful information to describe the scene and objects in the image. Accordingly, discovering visual concepts from the weakly labeled images may provide a valuable source of labeled datasets to the tasks of visual and scene recognition. For example, in an e-commerce site, listings of items for sale may include images of items and descriptions of the items. The item descriptions can be used as weak labels for the item images, and the set of item listings and corresponding descriptions used to train an image recognition engine.

The weak labels can be used by visual concept detectors to identify concepts for the images using an iterative hard instance learning algorithm to discover visual concepts from the label and visual feature representations in the weakly labeled images. In some example embodiments, each visual concept detector detects a single visual concept. In other example embodiments, the visual concept detectors may identify multiple visual concepts. The visual concept detectors can be directly applied to concept recognition and detection.

Weak labels may be provided or identified in a variety of ways. For example, each image may have one or more tags. Each tag indicates a concept associated with the image. The tags are only weak labels because the meaning of the tag may not be contained within the image itself. For example, if someone has a birthday party at a lake, an image of the lake itself may be tagged as "lake" and "birthday," even though the image itself is merely of the lake. Another example of a weak label is a caption associated with an image. As with the tag example, it is likely that one or more of the words or phrases in the caption describes at least a portion of the image. However, it is also likely that additional words or phrases in the caption provide context for the image in the scope of a larger work, such as an essay, and do not describe the contents of the image itself. By contrast with a strong label, which definitively labels an image, weak labels have noise. Accordingly, while a weak label likely has a relationship with an associated image, there is a probability that the weak label is unrelated.

FIG. 1 is a network diagram illustrating a network environment 100 suitable for discovering visual concepts from weakly labeled image collections, according to some example embodiments. The network environment 100 includes a visual concept server 120, a database server 130, and devices 150A and 150B, all communicatively coupled to each other via a network 140. The devices 150A and 150B may be collectively referred to as "devices 150," or generically referred to as a "device 150." The visual concept server 120 and the database 130 may be part of a network-based system 110. The visual concept server 120, the database server 130, and the devices 150 may each be implemented in a computer system, in whole or in part, as described below with respect to FIG. 7.

The visual concept server 120 creates a training set for classifying images, provides an image classification service, or both. For example, the visual concept server 130 can create a training set for classifying images by identifying strong labels for weakly-labeled images. The visual concept server 120 can also respond to requests for classification of images by providing one or more labels for the image. The visual concept server 120 may provide data to other machines (e.g., the devices 150 or other servers) via the network 140 or another network. The visual concept server 120 may receive data from other machines (e.g., the devices 150, other devices, or other servers) via the network 140 or another network.

Also shown in FIG. 1 are users 160A and 160B. The users 160A and 160B may be collectively referred to as "users 160," or generically referred to as a "user 160." The user 160 may be a human user (e.g., a human being), a machine user (e.g., a computer configured by a software program to interact with the devices 150 and the visual concept server 120), or any suitable combination thereof (e.g., a human assisted by a machine or a machine supervised by a human). The users 160A and 160B are associated with the devices 150A and 150B, respectively. For example, the device 150 may be a sensor, a desktop computer, a vehicle computer, a tablet computer, a navigational device, a portable media device, or a smart phone belonging to the user 160.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 7. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 140 may be any network that enables communication between or among machines, databases, and devices (e.g., the visual concept server 120 and the devices 150). Accordingly, the network 140 may be a wired network, a wireless network (e.g., a mobile or cellular network), or any suitable combination thereof. The network 140 may include one or more portions that constitute a private network, a public network (e.g., the Internet), or any suitable combination thereof.

Figure 2:
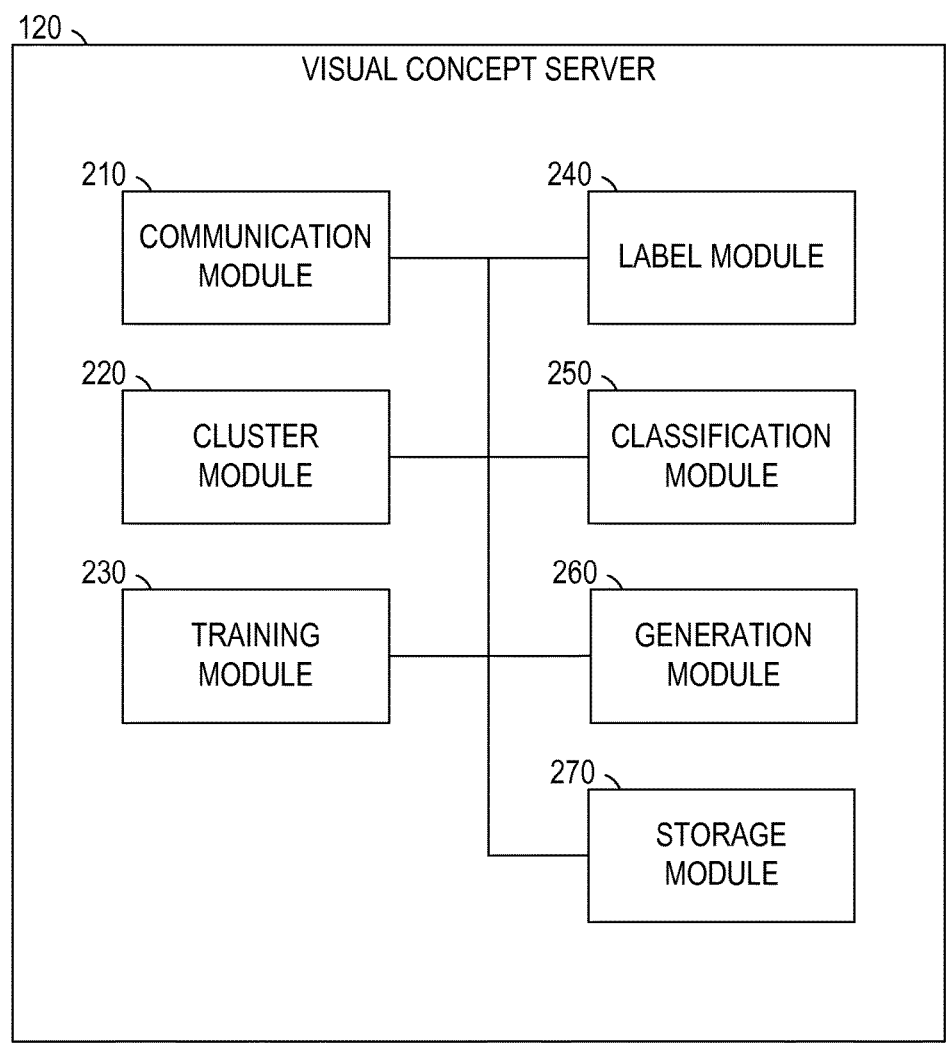
FIG. 2 is a block diagram illustrating components of a server suitable for discovering visual concepts from weakly labeled image collections, according to some example embodiments.

FIG. 2 is a block diagram illustrating components of the visual concept server 120, according to some example embodiments. The visual concept server 120 is shown as including a communication module 210, a cluster module 220, a training module 230, a label module 240, a classification module 250, a generation module 260, a storage module 270, and an application module 280 all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 is configured to send and receive data. For example, the communication module 210 may receive image data over the network 140 and send the received data to the classification module 250. As another example, the classification module 250 may identify a set of labels for an item, and the set of labels for the item may be transmitted by the communication module 210 over the network 140 to the device 150. In yet another example, the communication module 210 may receive a set of weakly labeled images and send the received data to the cluster module 220 for processing. After the cluster module 220, the training module 230, and the label module 240 have identified strong labels for the images, the results may be stored in a database by the storage module 270 or sent to another machine using the communication module 210.

The cluster module 220 is configured to cluster images sharing a weak label. For example, the feature vectors for each image having a particular weak vector can be compared to each other to determine which images have the greatest similarity to each other. Clustering may be performed using affinity propagation, k-means clustering, or in another way.

The training module 230 is configured to train a recognition engine. For example, the recognition engine may be a convolutional neural network (CNN) and training may include providing positive and negative examples with a learning factor.

The label module 240 is configured to assign strong labels to weakly labeled images. For example, the recognition engine trained by the training module 230 may be applied to the weakly-labeled dataset to generate strong labels for the images of the dataset.

The classification module 250 is configured to receive and process image data. The image data may be a two-dimensional image, a three-dimensional image, a depth image, an infrared image, a binocular image, or any suitable combination thereof. For example, an image may be received from a camera. To illustrate, a camera may take a picture and send it to the classification module 250. The classification module 250 determines a set of labels for the image using a vision recognition algorithm trained on a dataset generated by the cluster module 220, the training module 230, and the label module 240.

The generation module 260 is configured to generate sub-images from input images. A sub-image size can be chosen and a portion of the input image of the chosen size treated as a sub-image. For example, an input image may have a size of 320 pixels square. Sub-images may be generated using an object proposal algorithm that partitions the image into blobs or regions that are likely to contain discrete objects or features. For example, a contiguous region of color may indicate the presence of a discrete object. In some example embodiments, sub-images are generated without first using an object identification algorithm. For example, the sub-image size may be chosen as 10×10 pixels, 30×40 pixels, or any other size. From the example input image, 1024 non-overlapping 10 pixel square images or 96,721 overlapping 10 pixel square images can be generated. Additional images of other sizes may also be generated.

The storage module 270 is configured to store and retrieve data generated and used by the cluster module 220, the training module 230, the label module 240, and the classification module 250. For example, the visual concept identification algorithm generated by training using the strongly-labeled dataset generated from a weakly-labeled dataset can be stored by the storage module 270 for retrieval by the classification module 250. Information regarding the set of labels for an image, generated by the classification module 250, can also be stored by the storage module 270. The device 150 or another machine can request the category for an image (e.g., by providing an image identifier) which can be retrieved from storage by the storage module 270 and sent over the network 140 using the communication module 210.

The application module 280 is configured to provide an application (e.g., a search engine, an online marketplace, or an online forum) using the classification module 250. In one example process flow, the communication module 210 receives an image for use by the application. For example, the image may be a search image for which a user is seeking related materials (e.g., images, web pages, documents, or videos). As another example, the image may be an image of an item to be sold on an online marketplace or an image of an item the user wishes to find on the online marketplace. As a third example, the image may be an image of an item a user wishes to include in a message posted on an online forum. The application module 280, via the classification module 250, retrieves a set of labels for the received image. The application module 280 responds appropriately to the retrieved labels, depending on the particular application being provided. For example, if the application is a search application, the retrieved labels are used as keywords for a search. As another example, if the application is an online marketplace and the image is of an item is being listed for sale, the labels are used as attributes for the item (e.g., brand, size, or color) and a category (e.g., toys, books, or clothes) for the item is selected based on the attributes. As yet another example, if the application is an online marketplace and the image is of an item being searched for, the labels are used as attributes for the item and the attributes are used to search for matching items. As still another example, if the image is for a message in an online forum, the retrieved labels are used to automatically tag the image with the labels (e.g., to allow retrieval by other users searching for posts having the labels as tags).

FIG. 3 is a block diagram illustrating a schema for a weakly-labeled data table 310 for use in a system for discovering visual concepts from weakly labeled image collections, according to particular disclosed embodiments. Each row in the weakly-labeled data table 310 includes an image and one or more weak labels. As shown, the image and the weak labels are directly stored within the weakly-labeled data table 310, but other data structures are used in other embodiments. For example, the image can be identified by a file name, by an index into an image table, or in another way. Similarly, a separate weak label table may be used to store the weak labels, cross-indexed to the weakly-labeled data table by a shared identifier. In another example embodiment, the image and the labels are stored in separate files linked by a common identifier. For example, Image001.jpg may contain an image and Image001.txt may contain the weak labels for that image.

As shown in the weakly-labeled data table 310, some tags refer to elements not depicted in the corresponding image. For example, the first row includes the labels "sun" and "England." However, the image in the first row does not show the sun, nor does it show England (or even contain anything that could be used to confirm that it was taken in England). Likewise, some elements in the image do not have corresponding tags. For example, the image includes both grass and sky, but does not have tags for either.

FIGS. 4A-4B are block diagrams illustrating an alternate schema for a weakly-labeled data table 410 for use in a system for discovering visual concepts from weakly labeled image collections, according to particular disclosed embodiments. Each row in the weakly-labeled data table 410 includes an image, one or more weak labels, and a set of extracted phrases. The extracted phrases may be generated from the supplied weak labels using the Stanford typed dependencies system or another phrase extraction system. Phrases may contain rich information, such as the relationship between an attribute and an object, the relationship between an object and a scene, or the relationship between two objects.

As shown in the weakly-labeled data table 410, the descriptive phrases for the image are treated as weak labels, but include details regarding the image that are personal to the individual that provided the image. A sentence contains not only several entities as the multiple tags of the image but also the relations among the entities. These relations of entities, composed as sentence fragments, can be easily understood and effectively used by people. These sentence fragments are treated as phrases, as shown in the third column of the weakly-labeled data table 410. A phrase may be more descriptive than a single keyword to describe the contents of the image. Meanwhile, visual phrases, which correspond to chunks of meaning bigger than objects and smaller than scenes, can be used as intermediate descriptors of each image. Thus, in a large dataset, thousands of phrases are extracted from the image sentence descriptions automatically. Then these phrases act as the weak labels of the images in the learning of visual concepts. After the sentences are parsed into short phrases and the low-frequency phrases are filtered out (e.g., phrases associated with fewer than 50 images, fewer than 1% of the images, or using another threshold), the remaining phrases associated with each image may be used as the weak labels for that image.

Figure 5:
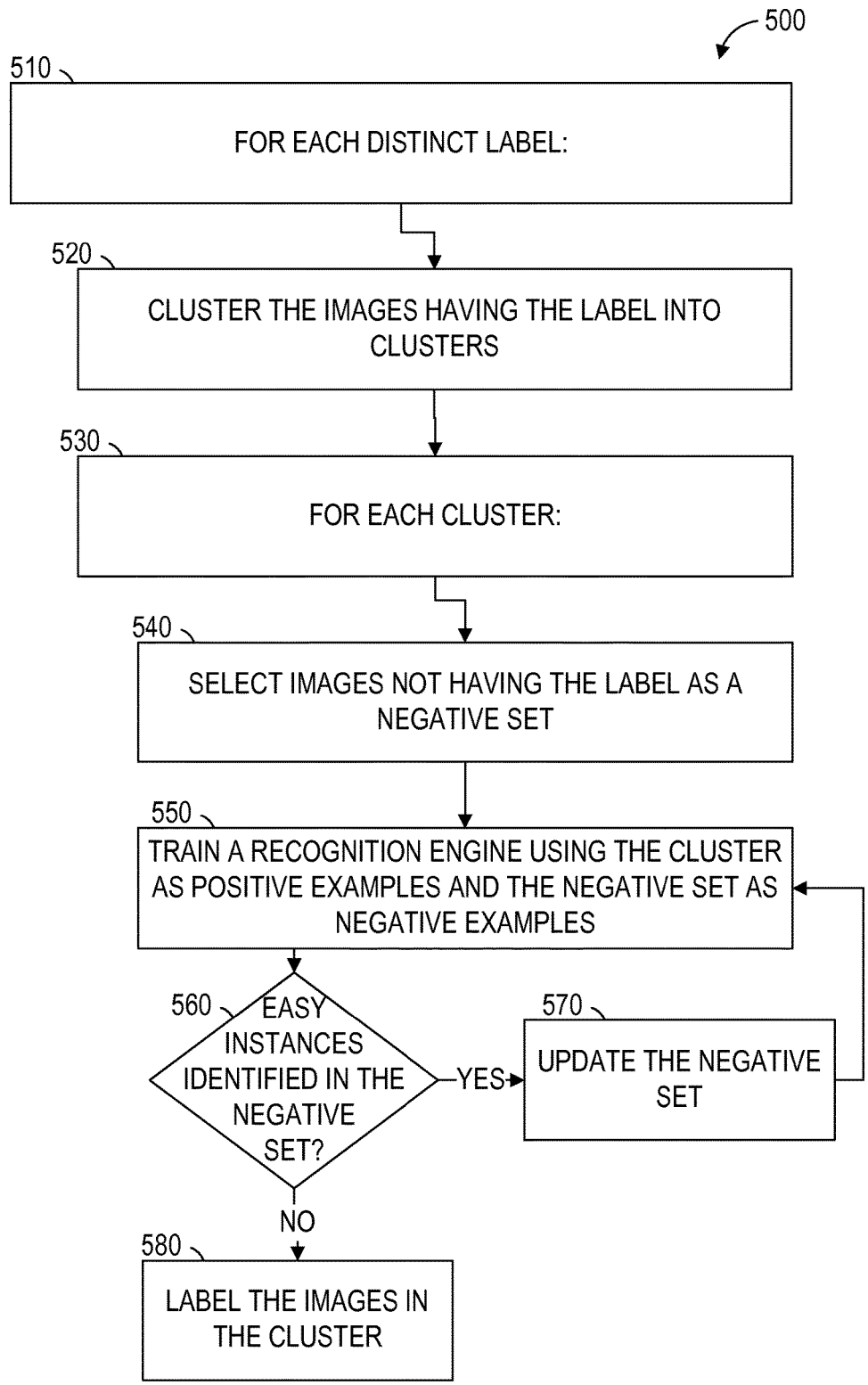
FIG. 5 is a flow diagram illustrating operations of a process for discovering visual concepts from weakly labeled image collections, according to particular disclosed embodiments.

FIG. 5 is a flow diagram illustrating operations of the visual concept server 120 in performing a process 500 of discovering visual concepts from weakly labeled image collections, according to particular disclosed embodiments. The process 500 includes operations 510, 520, 530, 540, 550, 560, 570, and 580. The operations in the process 500 are described as being performed by modules of the visual concept server 120, by way of example and not limitation.

One challenge that may be presented in discovering visual concepts from weakly labeled image collections stems from the noisy labels associated with the images (i.e., labels that are weakly associated with an image but will not be strongly associated with the image) and the absence of desired labels (i.e., labels that are will be strongly associated with an image but are not weakly associated with the image). Thus, there is initially no clear separation of the positive set and negative set of training images in the dataset. If the images with a certain label are negative images for the label, there may be many false positives (i.e., images with some concept label but with no noticeable image content related to that concept) in the positive set and false negatives (i.e., images with some visible concept inside but without that concept labeled) in the negative set. To address this problem, example embodiments consider the false positive and false negatives as hard instances in the learning of visual concepts. For a label t, the sets of hard and easy instances in the set D of images can be defined as $$H_t = \{(x,y) \in D | y w_t \cdot x < \eta\}$$

$$E_t = \{(x,y) \in D | y w_t \cdot x > \eta\}$$

where $w_t$ is the support vector machine (SVM) weight of the detector, x is the feature vector, and y is in the set $\{-1, 1\}$. Here $\eta$ is the threshold to determine whether an image is a hard instance for the label t. The value of y is initially set to 1 for all feature vectors x having the label t and −1 for all other feature vectors x. The value of $\eta$ may be different for each label t. In some example embodiments, the value of $\eta$ is automatically determined for each label t based on a desired percentage of hard instances. For example, the value of $\eta$ may be determined to be the value that results in $H_t$ being 5% of D, 10% of D, 30% of D, or some other percentage of D.

The cluster module 220 loops over each distinct label t in the weakly-imaged dataset (operation 510), performing operations 520 and 530 for each label. In operation 520, the cluster module 220 clusters the images having the label t into clusters. The number of clusters, $M_t$, may impact the variance of the learned detectors. Different values of $M_t$ are used in various embodiments. For example, $M_t$ may be selected to be in the range of 1-10 (e.g., the value of 4 may be used). A larger value of $M_t$ may increase the diversity of concepts, but may also increase the redundancy of concept detectors. Clustering may be accomplished using k-means clustering on image features. When the clustering for a label is weak, that may be an indication that the label t is not appropriate for use as a strong label. For example, if the weak label t is "the," there will be no particular correlation between the label and the images having the label. Accordingly, the k-means clustering will result in images having only slightly higher affinity for their assigned cluster than for other clusters, which provides a hint that "the" is a poor choice for a strong label. Thus, when the average cluster value for images having label t falls below a threshold, the label t may be discarded.

Each cluster generated in operation 520 is looped over in operation 530. Thus, for each cluster, appropriate ones of operations 540-580 are performed, as described below. In operation 540, a set of images not having the label t are selected as the negative set. For example, a predetermined number of images not having the label t may be randomly selected as the initial negative set. The predetermined number of images in the negative set may be a multiple of the number of images in the positive set (e.g., 5 times as many, 10 times as many, or another multiple).

The training module 230 trains a recognition engine using the images in the cluster as positive examples and the negative set as negative examples (operation 550). For example, a CNN, an SVM, or a CNN in conjunction with an SVM can be used as a recognition engine and be trained using well-known techniques.

The images in the negative set are tested by the training module 230 to determine if they are easy or hard instances. If any instances are easy (operation 560), processing continues with operation 570. Otherwise, the iterative training process stops, and processing continues with operation 580.

In operation 570, the easy instances are removed from the negative set and additional images are added to replace them. After the negative set is updated, the process returns to operation 550 to train the recognition engine using the positive set and the new negative set.

After training is complete, the label module 240 labels each image in the cluster (operation 580) with the top labels for the cluster. For example, a predetermined number k of labels may be used, with the labels for the cluster ranked using tf-idf and the highest k ranked labels assigned to the images in the cluster.

FIG. 6 is a block diagram illustrating a schema for a strongly-labeled data table 610 for use in a system for discovering visual concepts from weakly labeled image collections, according to particular disclosed embodiments. Each row in the strongly-labeled data table 610 includes an image and one or more strong labels. As shown, the image and the weak labels are directly stored within the strongly-labeled data table 610, but other data structures are used in other embodiments. For example, the image can be identified by a file name, by an index into an image table, or in another way. Similarly, a separate weak label table may be used to store the weak labels, cross-indexed to the weakly-labeled data table by a shared identifier. In another example embodiment, the image and the labels are stored in separate files linked by a common identifier. For example, Image001.jpg may contain an image and Image001.txt may contain the weak labels for that image.

Figure 7:
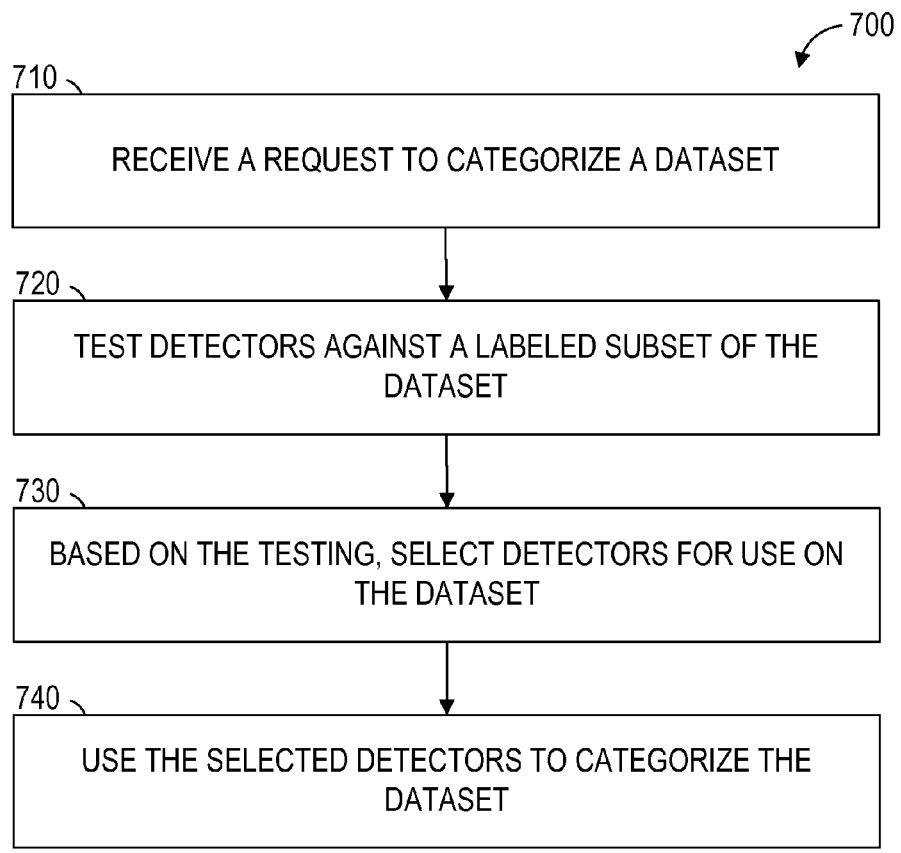
FIG. 7 is a flow diagram illustrating operations of a process for discovering visual concepts for a partially labeled image collection, according to particular disclosed embodiments.

FIG. 7 is a flow diagram illustrating operations of the visual concept server 120 in performing a process 700 of discovering visual concepts for a partially labeled image collection, according to particular disclosed embodiments. The process 700 includes operations 710, 720, 730, and 740. The operations in the process 700 are described as being performed by modules of the visual concept server 120, by way of example and not limitation.

In operation 710, the communication module 210 receives a request to categorize a set of images, at least some of which are already labeled. Some or all of the labeled images are selected for use as a selection set. For example, 10% of the images may have been manually labeled prior to submission to the visual concept server 120 and all of the labeled images may be used as the selection set.

The classification module 250, in operation 720, classifies the labeled images using a full set of detectors (e.g., a set of detectors generated using the process 500). The relevant concept detector with the highest accuracy or precision on the selection set is selected (in operation 730).

The selected detectors are used by the classification module 250 to categorize the remaining images in the image collection (in operation 740). The results are stored by the storage module 270 (e.g., in a database of the database server 130), transmitted back to the requestor via the communication module 210, or both. Thus, once the process 700 is complete, all of the images are labeled even though only a small percentage (10% in this example) were labeled at the beginning of the process.

Figure 8:
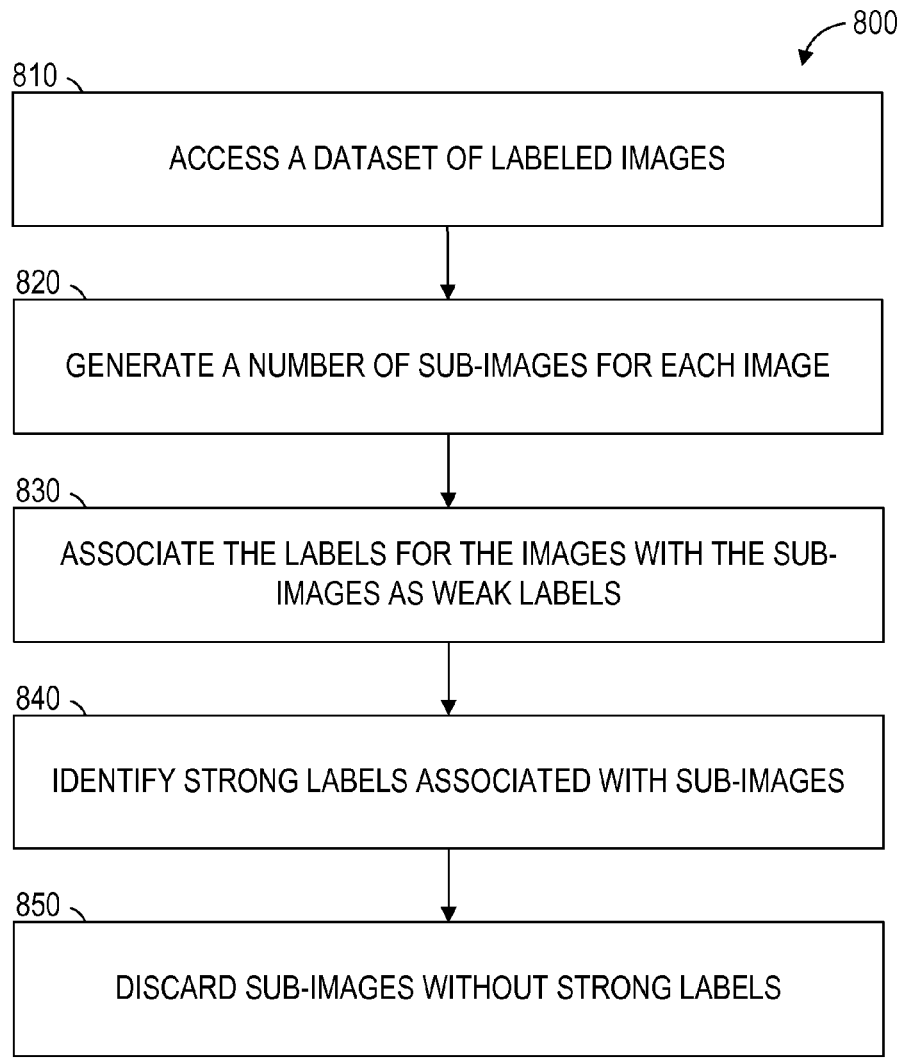
FIG. 8 is a flow diagram illustrating operations of a process for identifying bounding boxes for a labeled dataset, according to particular disclosed embodiments.

FIG. 8 is a flow diagram illustrating operations of the visual concept server 120 in performing a process 800 of identifying bounding boxes for a labeled dataset, according to particular disclosed embodiments. The process 800 includes operations 810, 820, 830, 840, and 850. The operations in the process 800 are described as being performed by modules of the visual concept server 120, by way of example and not limitation.

In operation 810, the generation module 260 accesses a dataset of strongly labeled images (e.g., via the storage module 270 or the communication module 210). The generation module 260 generates a number of sub-images for each image in the dataset (operation 820). For example, 10,000 sub-images of random sizes and locations within each image can be generated, a few dozen sub-images suggested by an object proposal algorithm can be generated, or any suitable combination thereof.

The visual concept server 120 associates the (strong) labels of the images with the sub-images as weak labels in operation 830. For example, if the image is strongly labeled as containing a tree and 10,000 sub-images of the image are generated, it is likely that a portion of the sub-images contain the tree and a portion do not. Accordingly, the sub-images are identified as weakly labeled by "tree."

The visual concept server identifies strong labels for each sub-image (operation 840). For example, a recognition engine trained using the process 500 can be used, as described above, to generate strong labels for each sub-image. Sub-images that lack strong labels are discarded (operation 850). Accordingly, at the end of the process 800, a number of sub-images corresponding to the labels of the input image set are generated and associated with some or all of those labels. In an example embodiment, the input images are displayed with the corresponding sub-images shown as bounding boxes within the input image, along with a list of tags associated with each sub-image.

Figure 9:
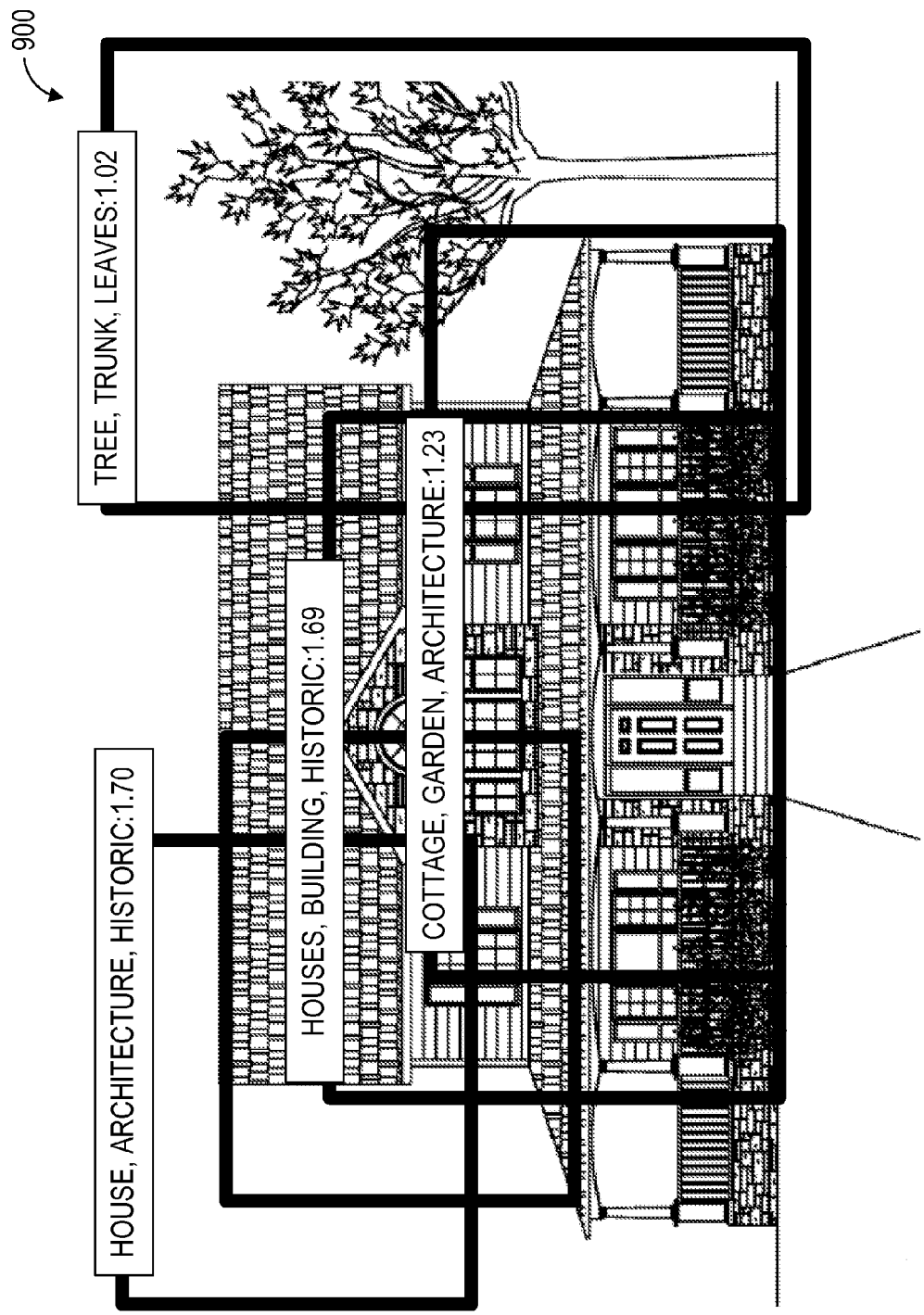
FIG. 9 is an example image with labeled sub-images and weights, according to some example embodiments

FIG. 9 shows an example image 900 with labeled sub-images and weights, according to some example embodiments. As shown, labeled sub-images are outlined in red, with a list of strong labels presented in the upper-left corner of sub-images having a high degree of affinity for the assigned labels. The if-tdf value for the cluster of the sub-image is shown alongside the assigned labels.

Figure 10:
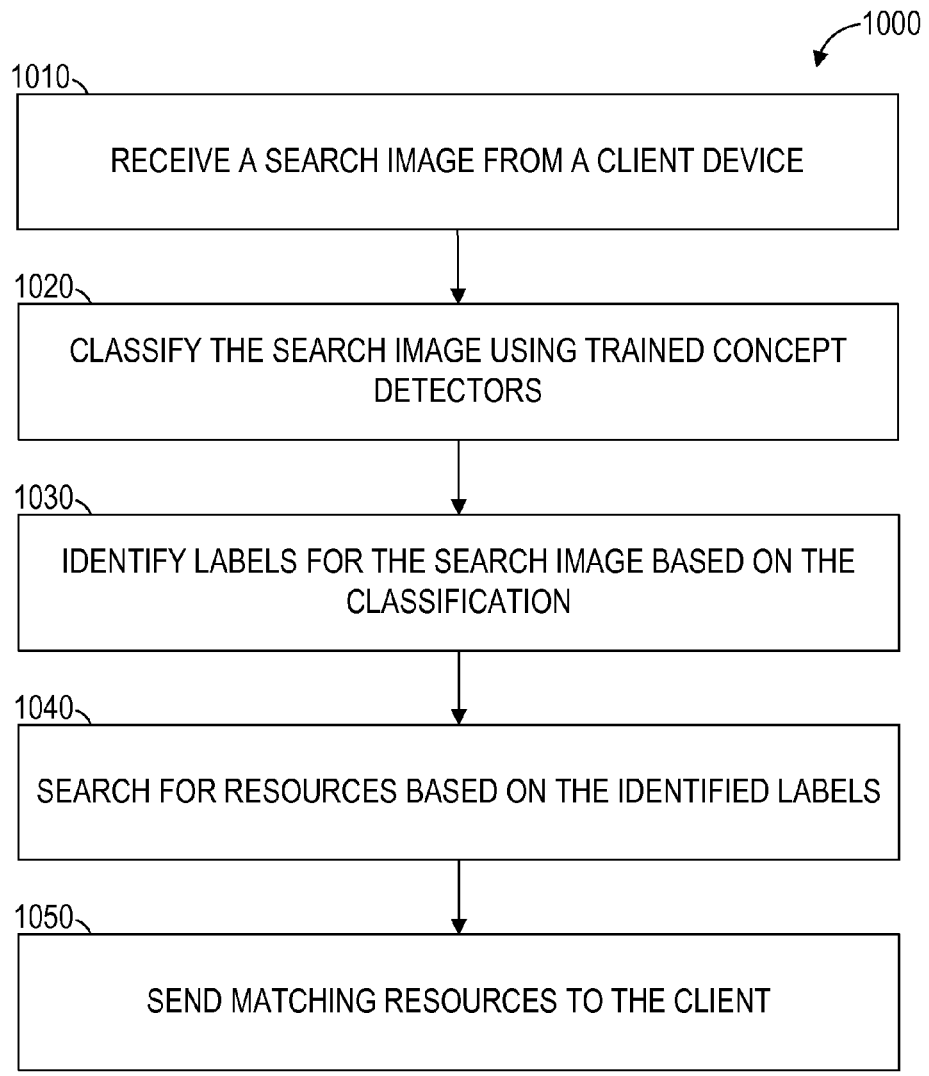
FIG. 10 is a flow diagram illustrating operations of a process for performing a search in response to an image, according to some example embodiments.

FIG. 10 is a flow diagram illustrating operations of the visual concept server 120 in performing a process 1000 of performing a search in response to an image, according to some example embodiments. The process 1000 includes operations 1010, 1020, 1030, 1040, and 1050. The operations in the process 1000 are described as being performed by modules of the visual concept server 120, by way of example and not limitation.

In operation 1010, the communication module 210 receives a search image from a client device (e.g., the client device 150A) via the network 140. The search image is classified, in operation 1020, by the classification module 250 using trained concept detectors (e.g., the concept detectors trained in the process 500). Labels for the search image are identified based on the classification (operation 1030) and used to search for resources (operation 1040) by the application module 280. For example, the image of FIG. 9 may be labeled with house, architecture, tree, building, and garden. Accordingly, those terms (house, architecture, tree, building, and garden) may be used to search for matching resources. In one example embodiment, the resources are web pages. In another example embodiment, the resources are images with associated labels. In operation 1050, the matching resources are sent to the client device by the application module 280 via the communication module 210. For example, a matching image may be transmitted to the client or a link to a web page may be transmitted to the client.

Figure 11:
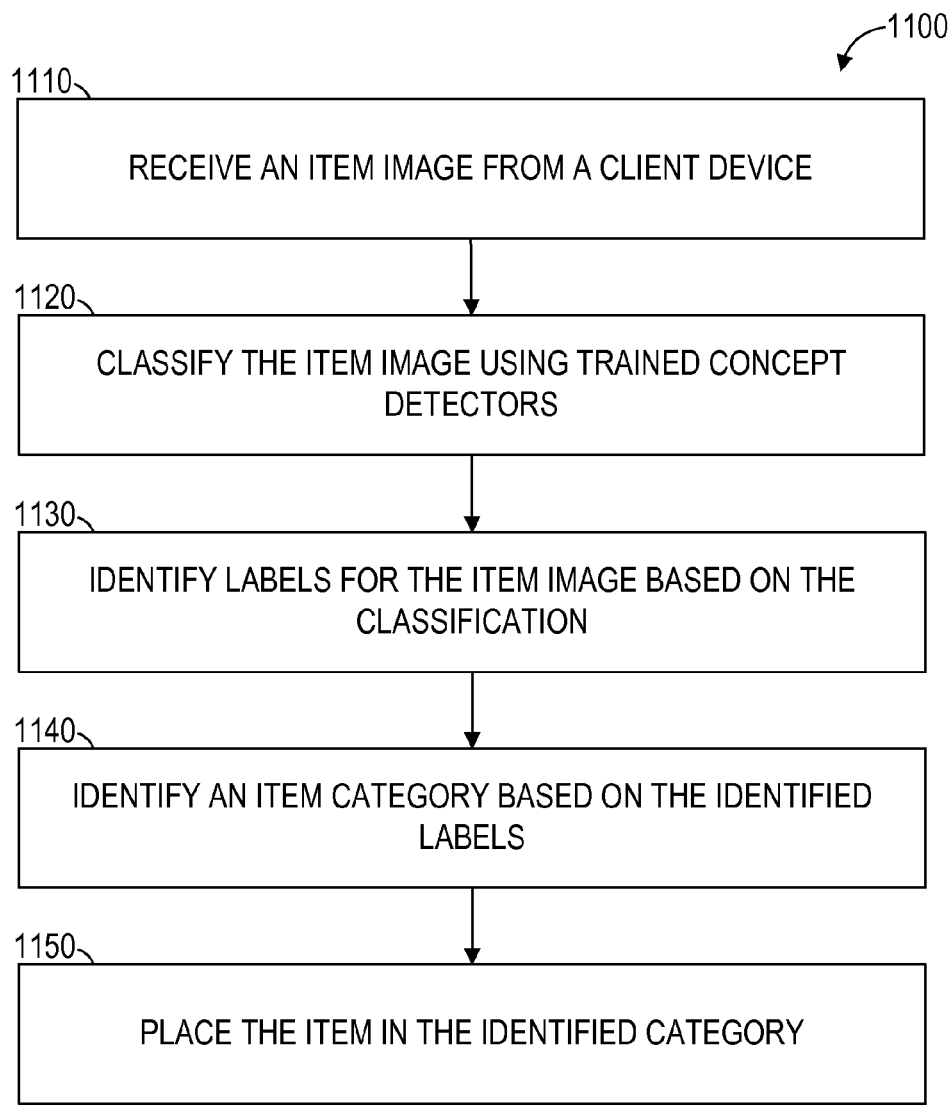
FIG. 11 is a flow diagram illustrating operations of a process for creating a display page for an item in response to an image, according to particular disclosed embodiments.

FIG. 11 is a flow diagram illustrating operations of the visual concept server 120 in performing a process 1100 of creating a display page for an item in response to an image, according to particular disclosed embodiments. The process 1100 includes operations 1110, 1120, 1130, 1140, and 1150. The operations in the process 1100 are described as being performed by modules of the visual concept server 120, by way of example and not limitation.

The communication module 210 receives an item image from a client device (e.g., the client device 150A) via the network 140 in operation 1110. For example, a user at a client device provides an image of an item to be sold on an online marketplace. The item image is classified, in operation 1120, by the classification module 250 using trained concept detectors (e.g., the concept detectors trained in the process 500) and labels are identified for the item based on the classification (operation 1130). For example, the labels may include color, type of item, size, and other attributes. In operation 1140, the application module 280 identifies an item category for the item based on the labels. For example, if the labels indicate that the item image includes a car, the item can be classified as an automobile. As another example, if the labels indicate that the item image includes a dress, the item can be classified as clothing. In operation 1150, the application module 280 places the item in the identified category. Continuing with the example of an item being listed for sale in an online marketplace, a listing for the item may be created with the item categorized in the category identified in the operation 1140.

According to various example embodiments, one or more of the methodologies described herein may facilitate discovering visual concepts from weakly labeled image collections. Moreover, one or more of the methodologies described herein may facilitate generating strongly-labeled datasets with less human involvement than existing methodologies. Furthermore, one or more of the methodologies described herein may facilitate discovering visual concepts from weakly labeled image collections more quickly and with a lower use of computational power compared to previous methods.

When these effects are considered in aggregate, one or more of the methodologies described herein may obviate a need for certain efforts or resources that otherwise would be involved in discovering visual concepts for a large dataset. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Software Architecture

Figure 12:
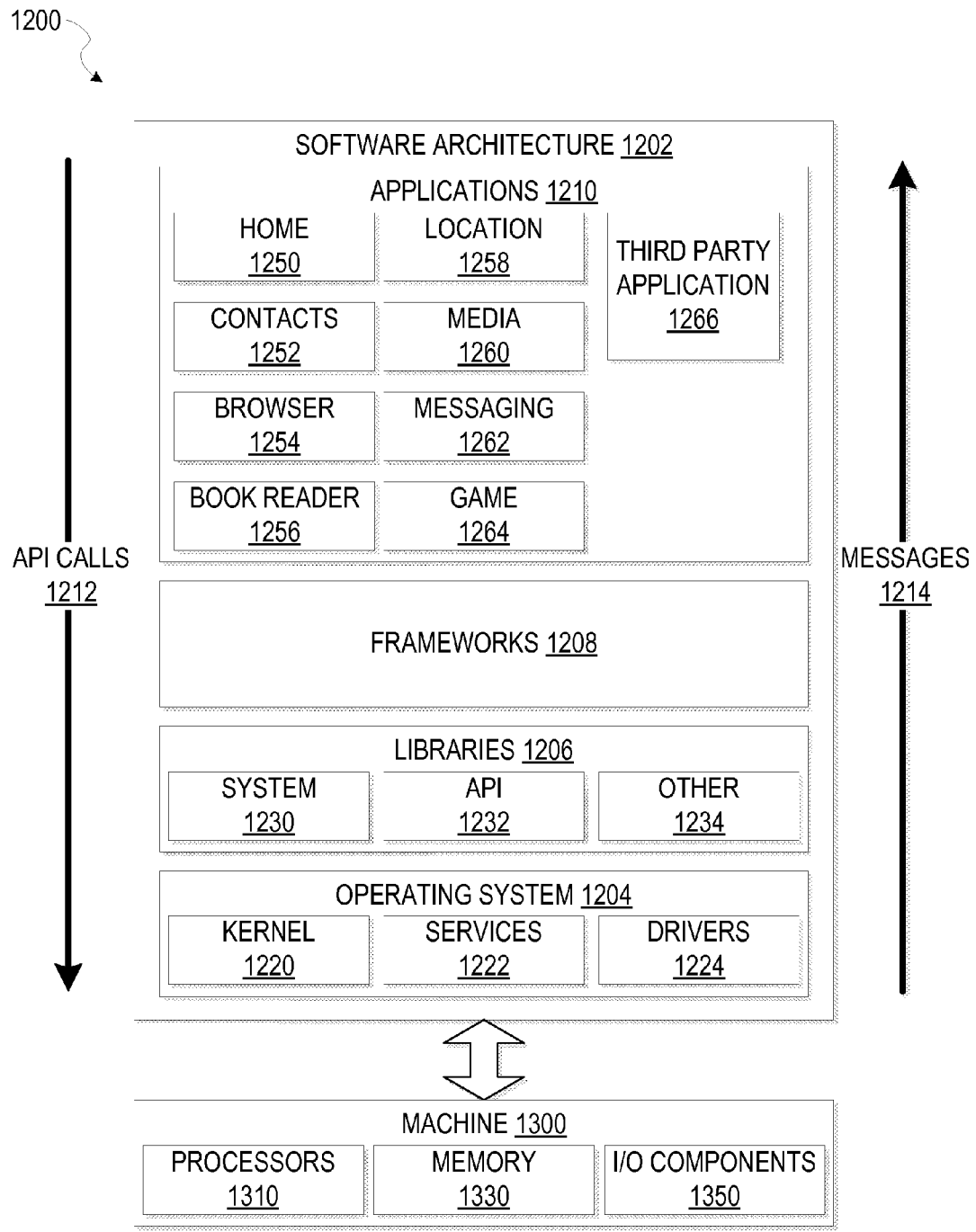
FIG. 12 is a block diagram illustrating an example of a software architecture that may be installed on a machine, according to some example embodiments.

FIG. 12 is a block diagram 1200 illustrating an architecture of software 1202, which may be installed on any one or more of the devices described above (e.g., device 150A, device 150B, visual concept server 120, or database server 130). FIG. 12 is merely a non-limiting example of a software architecture, and it will be appreciated that many other architectures may be implemented to facilitate the functionality described herein. The software 1202 may be implemented by hardware such as machine 1300 of FIG. 13 that includes processors 1310, memory 1330, and I/O components 1350. In this example architecture, the software 1202 may be conceptualized as a stack of layers where each layer may provide a particular functionality. For example, the software 1202 includes layers such as an operating system 1204, libraries 1206, frameworks 1208, and applications 1210. Operationally, the applications 1210 invoke application programming interface (API) calls 1212 through the software stack and receive messages 1214 in response to the API calls 1212, according to some implementations.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers in some implementations. For example, the kernel 1220 provides memory management, processor management (e.g., scheduling), component management, networking, security settings, among other functionality. The services 1222 may provide other common services for the other software layers. The drivers 1224 may be responsible for controlling or interfacing with the underlying hardware. For instance, the drivers 1224 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 1206 provide a low-level common infrastructure that may be utilized by the applications 1210. The libraries 1206 may include system 1230 libraries (e.g., C standard library) that may provide functions such as memory allocation functions, string manipulation functions, mathematic functions, and the like. In addition, the libraries 1206 may include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1206 may also include a wide variety of other libraries 1234 to provide many other APIs to the applications 1210.

The frameworks 1208 provide a high-level common infrastructure that may be utilized by the applications 1210, according to some implementations. For example, the frameworks 1208 provide various graphic user interface (GUI) functions, high-level resource management, high-level location services, and so forth. The frameworks 1208 may provide a broad spectrum of other APIs that may be utilized by the applications 1210, some of which may be specific to a particular operating system or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications such as third party application 1266. According to some embodiments, the applications 1210 are programs that execute functions defined in the programs. Various programming languages may be employed to create one or more of the applications 1210, structured in a variety of manners, such as object-orientated programming languages (e.g., Objective-C, Java, or C++) or procedural programming languages (e.g., C or assembly language). In a specific example, the third party application 1266 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1266 may invoke the API calls 1212 provided by the mobile operating system 1204 to facilitate functionality described herein.

Example Machine Architecture and Machine-Readable Medium

Figure 13:
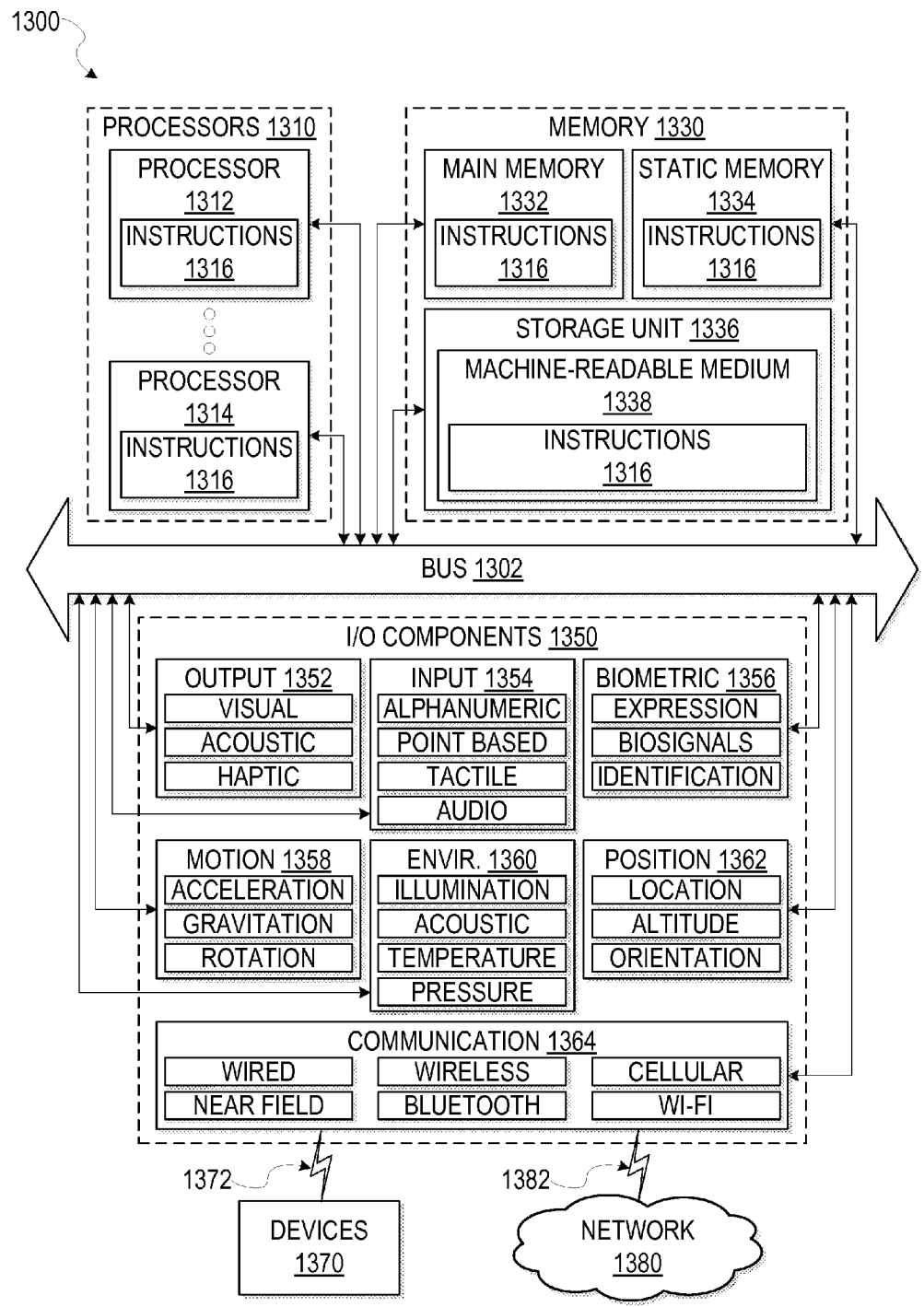
FIG. 13 illustrates a diagrammatic representation of a machine in the form of a computer system within which a set of instructions may be executed for causing the machine to perform any one or more of the methodologies discussed herein, according to an example embodiment.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory 1330, and I/O components 1350, which may be configured to communicate with each other via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1312 and processor 1314 that may execute instructions 1316. The term "processor" is intended to include multi-core processors that may comprise two or more independent processors (also referred to as "cores") that may execute instructions contemporaneously. Although FIG. 13 shows multiple processors, the machine 1300 may include a single processor with a single core, a single processor with multiple cores (e.g., a multi-core process), multiple processors with a single core, multiple processors with multiples cores, or any combination thereof.

The memory 1330 may include a main memory 1332, a static memory 1334, and a storage unit 1336 accessible to the processors 1310 via the bus 1302. The storage unit 1336 may include a machine-readable medium 1338 on which is stored the instructions 1316 embodying any one or more of the methodologies or functions described herein (e.g., instructions to implement the communication module 210, the cluster module 220, the training module 230, the label module 240, the classification module 250, the generation module 260, the storage module 270, and the application module 280 of the visual concept server 120). The instructions 1316 may also reside, completely or at least partially, within the main memory 1332, within the static memory 1334, within at least one of the processors 1310 (e.g., within the processor's cache memory), or any suitable combination thereof, during execution thereof by the machine 1300. Accordingly, in various implementations, the main memory 1332, static memory 1334, and the processors 1310 are considered as machine-readable media 1338.

As used herein, the term "memory" refers to a machine-readable medium 1338 able to store data temporarily or permanently and may be taken to include, but not be limited to, random-access memory (RAM), read-only memory (ROM), buffer memory, flash memory, and cache memory. While the machine-readable medium 1338 is shown in an example embodiment to be a single medium, the term "machine-readable medium" should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1350 include a wide variety of components to receive input, provide output, produce output, transmit information, exchange information, capture measurements, and so on. In general, it will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 include output components 1352 and input components 1354. The output components 1352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and force of touches or touch gestures, or other tactile input components), audio input components (e.g., a microphone), and the like.

In some further example embodiments, the I/O components 1350 include biometric components 1356, motion components 1358, environmental components 1360, or position components 1362 among a wide array of other components. For example, the biometric components 1356 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 include acceleration sensor components (e.g., accelerometer), gravitation sensor components, rotation sensor components (e.g., gyroscope), and so forth. The environmental components 1360 include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detection concentrations of hazardous gases for safety or to measure pollutants in the atmosphere), or other components that may provide indications, measurements, or signals corresponding to a surrounding physical environment. The position components 1362 include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via coupling 1382 and coupling 1372, respectively. For example, the communication components 1364 include a network interface component or another suitable device to interface with the network 1380. In further examples, communication components 1364 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a Universal Serial Bus (USB)).

Moreover, in some implementations, the communication components 1364 detect identifiers or include components operable to detect identifiers. For example, the communication components 1364 include Radio Frequency Identification (RFID) tag reader components, NFC smart tag detection components, optical reader components (e.g., an optical sensor to detect a one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 1364, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1380 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network and the coupling 1382 may be a Code Division Multiple Access (CDMA) connection, a Global System for Mobile communications (GSM) connection, or other type of cellular or wireless coupling. In this example, the coupling 1382 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

In example embodiments, the instructions 1316 are transmitted or received over the network 1380 using a transmission medium via a network interface device (e.g., a network interface component included in the communication components 1364) and utilizing any one of a number of well-known transfer protocols (e.g., Hypertext Transfer Protocol (HTTP)). Similarly, in other example embodiments, the instructions 1316 are transmitted or received using a transmission medium via the coupling 1372 (e.g., a peer-to-peer coupling) to devices 1370. The term "transmission medium" shall be taken to include any intangible medium that is capable of storing, encoding, or carrying instructions 1316 for execution by the machine 1300, and includes digital or analog communications signals or other intangible medium to facilitate communication of such software.

Furthermore, the machine-readable medium 1338 is non-transitory (in other words, not having any transitory signals) in that it does not embody a propagating signal. However, labeling the machine-readable medium 1338 as "non-transistory" should not be construed to mean that the medium is incapable of movement; the medium should be considered as being transportable from one physical location to another. Additionally, since the machine-readable medium 1338 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a memory having instructions embodied thereon;
a processor configured by the instructions to perform operations comprising:
accessing a set of images uploaded to a network-based system by a plurality of users of a network-based service provided by the network-based system, each image of the set of images having a text description of the corresponding image as provided by a user of the plurality of users who uploaded the corresponding image;
generating a set of associated weak labels for each image of the set of images based on the corresponding text description of the respective image, each set of associated weak labels including one or more weak labels for the respective image that are derived from the corresponding text description of the respective image;
generating a weakly-labeled dataset comprising the set of images;
clustering images of the set of images based on each of the clustered images sharing a particular label of the weak labels;
accessing a set of examples selected from the set of images uploaded to the network-based system, each example of the set of examples being selected based on the respective example not being associated with the particular label associated with the clustered images;
training a recognition engine using the clustered images as positive examples and the set of examples as negative examples; and
generating strong labels for the clustered images using the trained recognition engine, the strong labels including the particular label based on a ranking of the particular label with respect to the cluster as provided by the trained recognition engine.

2. The system of claim 1, wherein the operations further comprise:
identifying an overall set of weak labels comprising a union of the sets of associated weak labels of the weakly-labeled dataset;
for each weak label in the set of weak labels:
determining a count of images in the weakly-labeled dataset associated with said weak label;
comparing the count of images with a threshold; and
in accordance with a determination that the count of images is below the threshold, causing said weak label to be ignored.

3. The system of claim 1, wherein the operations further comprise:
using the recognition engine to determine weak instances in the set of examples;
in accordance with a determination that a weak instance is in the set of examples:
modifying the set of examples by:
removing the weak instance from the set of examples; and
adding to the set of examples a replacement image selected from the set of images, the replacement image not being associated with the weak label associated with the clustered images; and
training the recognition engine using the clustered images as positive examples and the modified set of examples as negative examples.

4. The system of claim 1, wherein the operations further comprise:
prior to the clustering of the images sharing the particular label, dividing the images sharing the particular label into a set of hard instances and a set of easy instances, each set having a size.

5. The system of claim 4, wherein the size of the set of hard instances is a predefined percentage of a count of the images sharing the particular label.

6. The system of claim 1, wherein the clustering of the images sharing the particular label comprises k-means clustering on features of the images.

7. A method comprising:
accessing a set of images uploaded to a network-based system by a plurality of users of a network-based service provided by the network-based system, each image of the set of images having a text description of the corresponding image as provided by a user of the plurality of users who uploaded the corresponding image;
generating a set of associated weak labels for each image of the set of images based on the corresponding text description of the respective image, each set of associated weak labels including one or more weak labels for the respective image that are derived from the corresponding text description of the respective image;
generating a weakly-labeled dataset comprising the set of images;
clustering images of the set of images based on each of the clustered images sharing an associated a particular label of the weak labels, by a processor of a machine;
accessing a set of examples selected from the set of images uploaded to the network-based system, each example of the set of examples being selected based on the respective example not being associated with the particular label associated with the clustered images;
training a recognition engine using the clustered images as positive examples and the set of examples as negative examples; and
generating, by one or more processors, strong labels for the clustered images, using the trained recognition engine.

8. The method of claim 7, further comprising:
identifying an overall set of weak labels comprising a union of the sets of associated weak labels of the weakly-labeled dataset;
for each weak label in the set of weak labels:
determining a count of images in the weakly-labeled dataset associated with said weak label;
comparing the count of images with a threshold; and
in accordance with a determination that the count of images is below the threshold, causing said weak label to be ignored.

9. The method of claim 7, further comprising:
using the recognition engine to determine weak instances in the set of examples;
in accordance with a determination that a weak instance is in the set of examples:
modifying the set of examples by:
removing the weak instance from the set of examples; and
adding to the set of examples a replacement image selected from the set of images, the replacement image not being associated with the weak label associated with the clustered images; and training the recognition engine using the clustered images as positive examples and the modified set of examples as negative examples.

10. The method of claim 7, further comprising:

prior to the clustering of the images sharing the particular label, dividing the images sharing the particular label into a set of hard instances and a set of easy instances, each set having a size.

11. The method of claim 10, wherein the size of the set of hard instances is a predefined percentage of a count of the images sharing the particular label.

12. The method of claim 7, wherein the clustering of the images sharing the particular label comprises k-means clustering on features of the images.

13. The method of claim 7, further comprising:

receiving, from a client device, a query comprising a query image;

identifying labels for the query image, using the trained recognition engine; and providing, to the client device, in response to the query, the labels for the query image.

14. The method of claim 7, further comprising:

receiving, from a client device, a query comprising a query image;

identifying labels for the query image, using the trained recognition engine;

identifying resources matching the labels; and providing, to the client device, in response to the query, the identified resources.

15. The method of claim 7, further comprising:

receiving, from a client device, an image of an item;

identifying labels for the image of the item, using the trained recognition engine;

identifying a category for the item based on the labels for the image of the item; and creating a sale listing of the item including the image of the item, the sale listing being categorized in the category for the item.

16. A non-transitory machine-readable medium having instructions embodied thereon, the instructions executable by one or more processors of a system to perform operations comprising:

accessing a set of images uploaded to a network-based system by a plurality of users of a network-based service provided by the network-based system, each image of the set of images having a text description of the corresponding image as provided by a user of the plurality of users who uploaded the corresponding image;

generating a set of associated weak labels for each image of the set of images based on the corresponding text description of the respective image, each set of associated weak labels including one or more weak labels for the respective image that are derived from the corresponding text description of the respective image;

generating a weakly-labeled dataset comprising the set of images;

clustering images of the set of images based on each of the clustered images sharing a particular label of the weak labels;

accessing a set of examples selected from the set of images uploaded to the network-based system, each example of the set of examples being selected based on the respective example not being associated with the particular label associated with the clustered images;

training a recognition engine using the clustered images as positive examples and the set of examples as negative examples; and generating strong labels for the clustered images using the trained recognition engine, the strong labels including the particular label based on a ranking of the particular label with respect to the cluster as provided by the trained recognition engine.

17. The non-transitory machine-readable medium of claim 16, wherein the operations further comprise:

identifying an overall set of weak labels comprising a union of the sets of associated weak labels of the weakly-labeled dataset;

for each label in the set of weak labels:

determining a count of images in the weakly-labeled dataset associated with said label;

comparing the count of images with a threshold; and in accordance with a determination that the count of images is below the threshold, causing said label to be ignored.

18. The non-transitory machine-readable medium of claim 16, wherein the operations further comprise:

using the recognition engine to determine weak instances in the set of examples;

in accordance with a determination that a weak instance is in the set of examples:

modifying the set of examples by:

removing the weak instance from the set of examples; and adding to the set of examples a replacement image selected from the set of images, the replacement image not being associated with the label associated with the clustered images; and training the recognition engine using the clustered images as positive examples and the modified set of examples as negative examples.

* * * * *